United States Patent
Bintin et al.

(10) Patent No.: US 12,283,913 B2
(45) Date of Patent: Apr. 22, 2025

(54) NON-CONDUCTIVE FRAME FOR USE IN PHOTOVOLTAIC PANEL

(71) Applicant: Saudi Arabian Oil Company, Dhahran (SA)

(72) Inventors: Anas Bintin, Thuwal (SA); Esra Alhabshi, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 226 days.

(21) Appl. No.: 17/591,094

(22) Filed: Feb. 2, 2022

(65) Prior Publication Data
US 2023/0246587 A1 Aug. 3, 2023

(51) Int. Cl.
*H02S 30/10* (2014.01)
*F16B 5/00* (2006.01)
*H02S 40/36* (2014.01)

(52) U.S. Cl.
CPC ............ *H02S 30/10* (2014.12); *F16B 5/0012* (2013.01); *H02S 40/36* (2014.12)

(58) Field of Classification Search
CPC ...................................................... H02S 30/10
See application file for complete search history.

(56) References Cited

U.S. PATENT DOCUMENTS

| | | | |
|---|---|---|---|
| 6,294,724 B1 * | 9/2001 | Sasaoka | H02S 20/25 438/66 |
| 8,109,048 B2 | 2/2012 | West et al. | |
| 8,188,620 B2 * | 5/2012 | Ghassemi | H01L 31/02021 136/252 |
| 8,371,076 B2 | 2/2013 | Jones et al. | |
| 2005/0072457 A1 * | 4/2005 | Glenn | H01L 31/052 136/246 |
| 2006/0243318 A1 * | 11/2006 | Feldmeier | H02S 40/34 136/244 |
| 2008/0302030 A1 * | 12/2008 | Stancel | H01L 31/0521 136/246 |
| 2009/0223555 A1 | 9/2009 | Ammar | |
| 2011/0290307 A1 | 12/2011 | Workman et al. | |

(Continued)

FOREIGN PATENT DOCUMENTS

| | | | | |
|---|---|---|---|---|
| EP | 3751624 A1 * | 12/2020 | | H01L 31/042 |
| JP | 6159377 B2 | 7/2017 | | |
| WO | WO-2010019745 A2 * | 2/2010 | | F24J 2/5211 |

*Primary Examiner* — Ryan S Cannon
(74) *Attorney, Agent, or Firm* — Fish & Richardson P.C.

(57) ABSTRACT

A photovoltaic panel and an interchangeable module are described. The photovoltaic panel includes a plurality of interchangeable modules that are mechanically and electrically interconnected. Each module includes a solar cell panel with electrically conductive ribbons providing electrical connections, the solar cell panel having a face extending between peripheral edges, a cell length, and a cell width; a frame receiving the solar cell panel that includes a front portion defining a central aperture through which the face of the solar cell panel is exposed; and a back portion attached to the front portion, the front portion and the back portion defining a groove extending around the central aperture and open to the central aperture, the groove having a groove length at least 10 millimeters longer than the cell length and a groove width at least 10 millimeters longer than the cell width, the solar cell panel received in the groove.

21 Claims, 12 Drawing Sheets

(56) References Cited

U.S. PATENT DOCUMENTS

| | | | |
|---|---|---|---|
| 2013/0056047 A1* | 3/2013 | Beck | H01L 31/048 |
| | | | 438/66 |
| 2014/0060624 A1* | 3/2014 | Kim | H02S 30/10 |
| | | | 136/251 |
| 2016/0204293 A1* | 7/2016 | Nakai | H01L 31/02008 |
| | | | 438/66 |
| 2018/0145200 A1* | 5/2018 | Aliabadi | H01L 31/02021 |
| 2020/0274483 A1* | 8/2020 | Sanglap | H02S 40/34 |
| 2021/0281211 A1* | 9/2021 | Tyler | H02S 20/10 |

* cited by examiner

NON-CONDUCTIVE FRAME FOR USE IN PHOTOVOLTAIC PANEL

TECHNICAL FIELD

The present disclosure generally relates to photovoltaic panels, more particularly photovoltaic panels that include a non-conductive interchangeable frame.

BACKGROUND

Photovoltaic panels convert the energy of light into electricity. More recent photovoltaic panels have polymer-based components instead of the commonly used glass components. This allows an overall weight reduction of the panel by 50% (e.g., a commercial panel with a polymer frame weighs 10 kilograms instead of 20 kg). Polymer frames have a higher coefficient of thermal expansion than glass.

SUMMARY

This specification describes photovoltaic panels that include interchangeable modules with non-conductive frames. The structure arrangement of the non-conductive frame limits thermal warping and expansion of the frame which can put tension on a solar cell panel inside the module and render the solar cell panel no longer operable.

The approach allows each module in the photovoltaic panel to be replaced individually when inoperable without a need to replace the whole panel. The photovoltaic panel can include a plurality of interchangeable modules that are mechanically and electrically interconnected. Each interchangeable module includes a solar cell panel and a non-conductive frame that receives the solar cell panel. The solar cell panel includes a face extending between peripheral edges, a cell length, a cell width, and electrically conductive ribbons that provide electrical connections. The non-conductive frame includes a front portion and a back portion that together define a groove. The frame holds the solar cell panel in place using the grooves. The grooves are sized so that the solar cell panel can expand into the frame. This structure limits binding between the solar cell panel and the frame that can cause the solar cell panel to bow outwards from the plane of the module. It also limits mechanical stresses at the connection between the frame and the solar cell panel that can damage a module.

In some aspects, a photovoltaic panel includes a plurality of interchangeable modules that are mechanically and electrically interconnected. Each module includes a solar cell panel with electrically conductive ribbons providing electrical connections, the solar cell panel having a face extending between peripheral edges, a cell length, and a cell width; a frame receiving the solar cell panel. The frame includes a front portion defining a central aperture through which the face of the solar cell panel is exposed; and a back portion attached to the front portion, the front portion and the back portion defining a groove extending around the central aperture and open to the central aperture, the groove having a groove length at least 10 millimeters longer than the cell length and a groove width at least 10 millimeters longer than the cell width, the solar cell panel received in the groove. The frame defines electrical connection points and the electrically conductive ribbons of the solar cell panel are disposed in the electrical connection points; and the frame has male mechanical connectors and female mechanical connectors positioned such that the male mechanical connectors on one module are engageable with the female mechanical connectors of an adjacent module.

In some aspects, an interchangeable module includes a solar cell panel; a frame receiving the solar cell panel. The frame includes a front portion defining a central aperture through which the face of the solar cell is exposed; and a back portion attached to the front portion, the front portion and the back portion defining a groove extending around the central aperture and open to the central aperture, the groove having a groove length at least 10 millimeters longer than the cell length and a groove width at least 10 millimeters longer than the cell width, the solar received in the groove. The frame defines electrical connection points and the electrically conductive ribbons of the solar cell panel are disposed in the electrical connection points; and the frame has male mechanical connectors and female mechanical connectors positioned such that the male mechanical connectors on one module are engageable with the female mechanical connectors of an adjacent module.

Embodiments of the photovoltaic panel and the interchangeable module can include one or more of the following features.

In some embodiments, the male mechanical connectors of each module are positioned on a first edge and a second edge of the module, and the female mechanical connectors positioned on a third edge of the module opposite the first edge and on a fourth edge of the module opposite the second edge. In some cases, the electrical connection points include two positive electrical connection points and two negative electrical connection points. In some cases, the two positive electrical connection points are collocated with the male mechanical connectors and the two negative electrical connection points are collocated with the female mechanical connectors.

In some embodiments, fasteners attaching the front portion of the frame to the back portion of the frame.

In some embodiments, the solar cell panel of the module includes a plurality of solar cells with anodes. In some cases, the anodes of all of the solar cells of the module are electrically connected to an anode of the module. In some cases, the anode of the module includes design B electrically connected in parallel and series. In some cases, the anode of the module includes design C electrically connected in series only.

In some embodiments, the solar cell panel of the module includes a plurality of solar cells with cathodes. In some cases, the cathodes of all of the solar cells of the module are electrically connected to a cathode of the module. In some cases, the cathodes of the module includes design A electrically connected in parallel and series.

The described photovoltaic panels provide good mobility, ease of deployment, the ability to switch between parallel and series connections based on application needs, and the ability to customize the panel shape based on the available space at the installation location. Due to their power-to-weight ratio, the described photovoltaic panels can be used for specialty applications such as ships, sailboats, or in locations where mounting a system is not feasible. The described photovoltaic panels mitigate the effect of thermal expansion of solar cell panels by providing enough space for the solar cell panels to expand within the frame and not cause the breakage of cells.

The details of one or more embodiments of these methods are set forth in the accompanying drawings and the description below. Other features, objects, and advantages of these methods will be apparent from the description, drawings, and claims.

DETAILED DESCRIPTION

This specification describes photovoltaic panels that include interchangeable modules with non-conductive frames. The structural arrangement of the non-conductive frames limit thermal warping of the solar cell panels which can put tension on a solar cell panel inside the module and render the solar cell panel inoperable.

The approach allows each module in the photovoltaic panel to be replaced individually when inoperable without a need to replace the whole panel. The photovoltaic panel can include a plurality of interchangeable modules that are mechanically and electrically interconnected. Each interchangeable module includes a solar cell panel and a non-conductive frame that receives the solar cell panel. The solar cell panel includes a face extending between peripheral edges with a cell length and a cell width, and electrically conductive ribbons that provide electrical connections. The non-conductive frame includes a front portion and a back portion that together define a groove. The frame holds the solar cell panel in place using the groove. The groove is sized so that the solar cell panel can expand into the frame. This structure limits binding between the solar cell panel and the frame that can cause the solar cell panel to bow outwards from the plane of the module. It also limits mechanical stresses at the connection between the frame and the solar cell panel that can damage a module.

Figure 1:
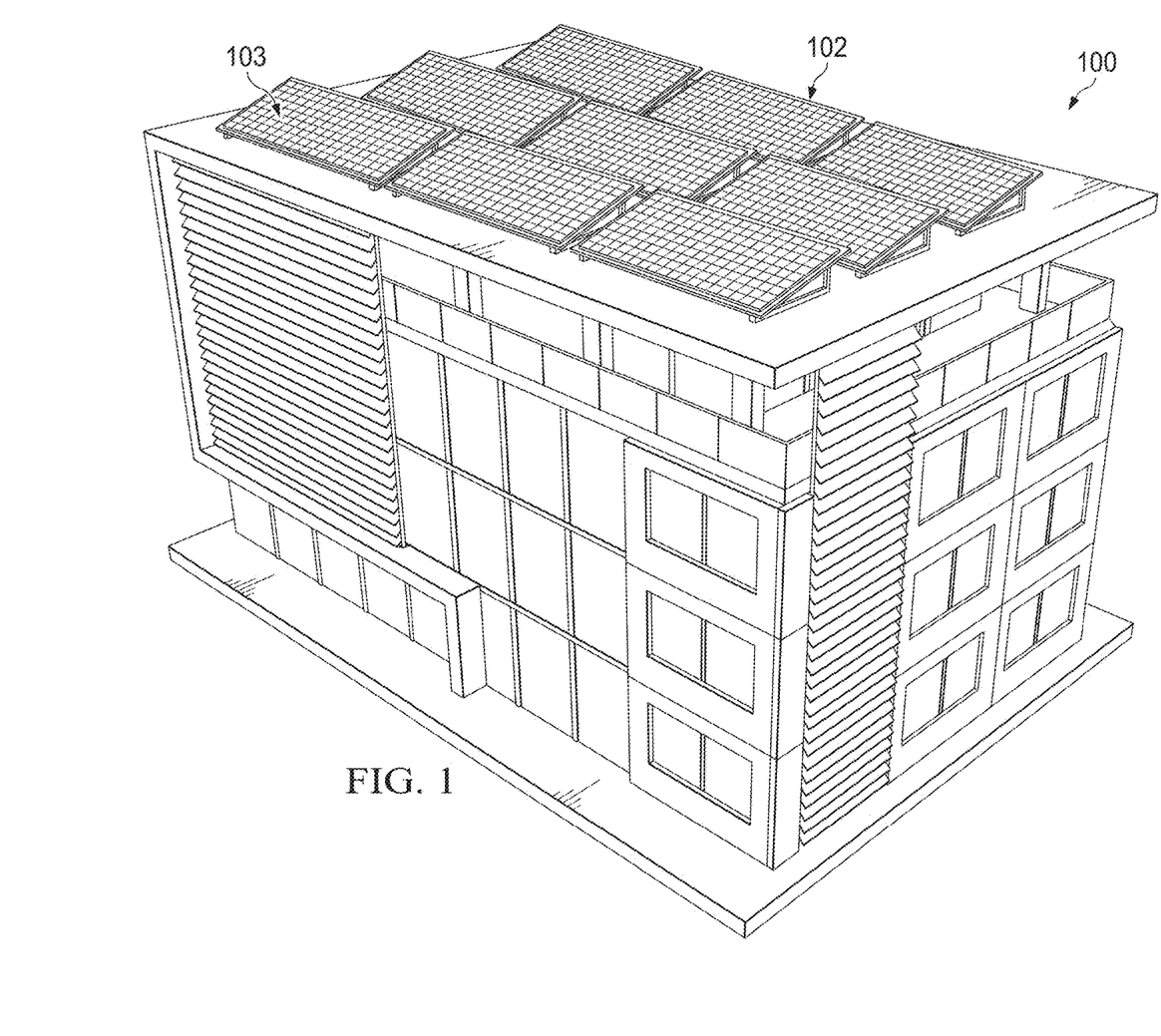
FIG. 1 is a schematic of photovoltaic panels installed on a building.

FIG. 1 is a schematic of photovoltaic panels 102 installed on building 100. Photovoltaics (PV) is the conversion of light into electricity using semiconducting materials that exhibit the photovoltaic effect. The photovoltaic effect is commercially utilized for electricity generation. Each photovoltaic panel 102 has a plurality of solar modules 103, each module including a number of solar cells, which generate electrical power. PV installations may be ground-mounted, rooftop-mounted, wall-mounted, or floating. The mount may be fixed or use a solar tracker to follow the sun across the sky. More recent photovoltaic panels include modules with polymer-based components instead of the commonly used glass components. The polymer-based components allow an overall weight reduction of the panel by 50% (e.g., a commercial panel with a polymer components weighs 10 kilograms instead of 20 kg). However, polymer components have a higher coefficient of thermal expansion than glass which can impose increasing tension on the solar cells in hot climates and lead to cracking and degradation.

Figure 2A:
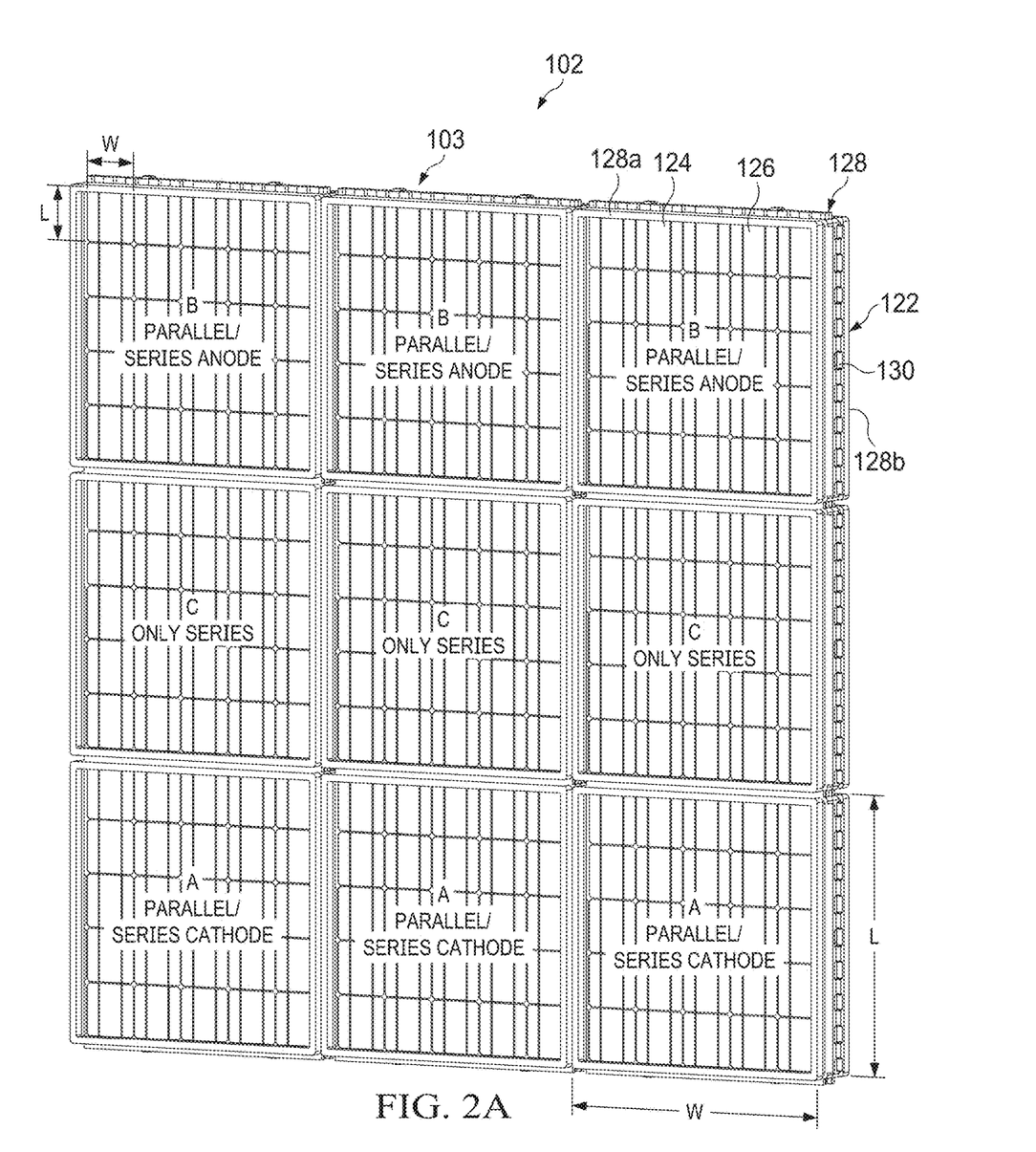
FIG. 2A is a perspective view of a photovoltaic panel made from interchangeable modules.

FIG. 2A is a perspective view of a photovoltaic panel 102 made with nine interchangeable modules 103. Each interchangeable module 122 includes a solar cell panel 124 and a frame 128. The solar cell panel 124 has a face extending between peripheral edges 126 with a cell length of between 42 cm and 85 cm and cell width of between 42 cm and 85 cm. The solar cell panels 124 of the modules 122 can include a plurality of solar cells with anodes and cathodes. The anodes of all of the solar cells in the solar cell panel 124 of the module 122 are electrically connected to an anode of the module 122. The cathodes of all of the solar cells in the solar cell panel 124 of the module 122 are electrically connected to a cathode of the module 122. The anode and the cathode of the module 122 can have three different electrical connection designs (e.g., design types A, B, and C). Design A, can include a cathode with a series type connection and an anode with a parallel type connection. Design B, can include an anode with a series type connection, and a cathode with a parallel type connection. Design C can include only series type connections. The structure of the modular frames for designs A, B, and C are the same. Designs A, B, and C differ in the configuration that allows the user to divert the cathode wiring into the parallel type connection. As shown the electrical circuit for the panel is represented with a diode form. In some implementations, the configurations are a multitude of wiring combinations with all being parallel or all being series. The proposed modular configuration enables a user to alternate based on the load and the need. The configuration can be changed to a series type connection or to a parallel type connection even after the frame design is sealed. This will not affect the sealing in the panel as the frame can be disconnected from the series connector (e.g., MC4 weather proof) and transition to a parallel type connection or the other way around.

Figure 2B:
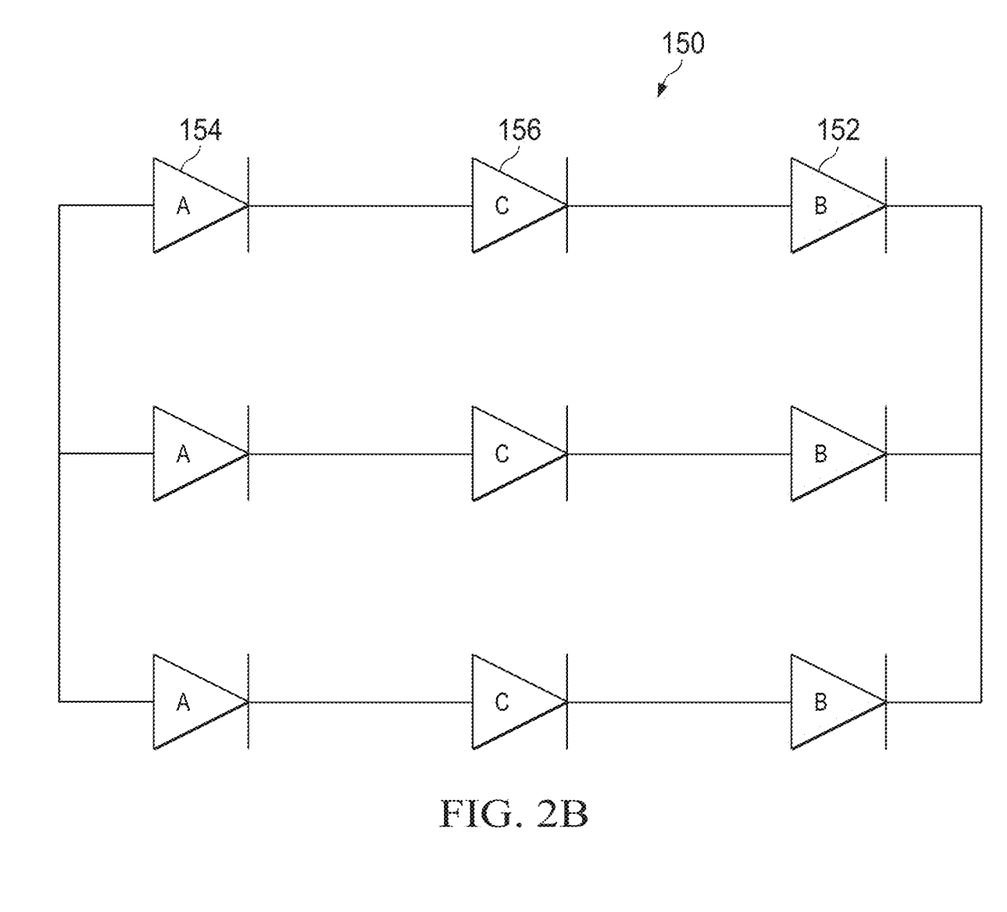
FIG. 2B is a schematic of the electrical connections for the photovoltaic panel of FIG. 2A.

FIG. 2B is a schematic 150 of the electrical connections 152, 154, and 156 for the photovoltaic panel 102 of FIG. 2A. Designs 152, 154, and 156 can connect the solar cell panels 124 to the frame 128 in each module 122 of the photovoltaic panel 102 in various configurations. In the illustrated implementation, frames B 152 and A 154 are used on the top and the bottom edges of the photovoltaic panel 102 and are used for both parallel connection and series connection with the type C 156 frame. Type C frame is for series connection and can be connected to all frame types. It can be connected to other C-type frames and both A and B frame designs. In some implementation, type A design can connect to type C frames in series and to type A frames in parallel. In some implementation, type B design can connect to type C frames in series and to type B frames in parallel. In some implementations, a type A or a type B frames are connected in series on the ends of a string of type C frames. This creates a full series connection array of mini-modules. The series connections are enabled through the series anode and cathode connectors 3 and 4. This array can be connected in parallel to another one through the parallel anode connector, 1 and 2, in frame A and the parallel cathode connector, 1 and 2, in frame B. The exposed parallel connection points on frame 128 are then covered with removable plastic caps or electrical putty for mechanical security and electrical safety. The solar cell panel 124 can include electrically conductive ribbons that provide electrical connection. The ribbons can include metal ribbons (e.g., copper or silver ribbons).

Figure 3A:
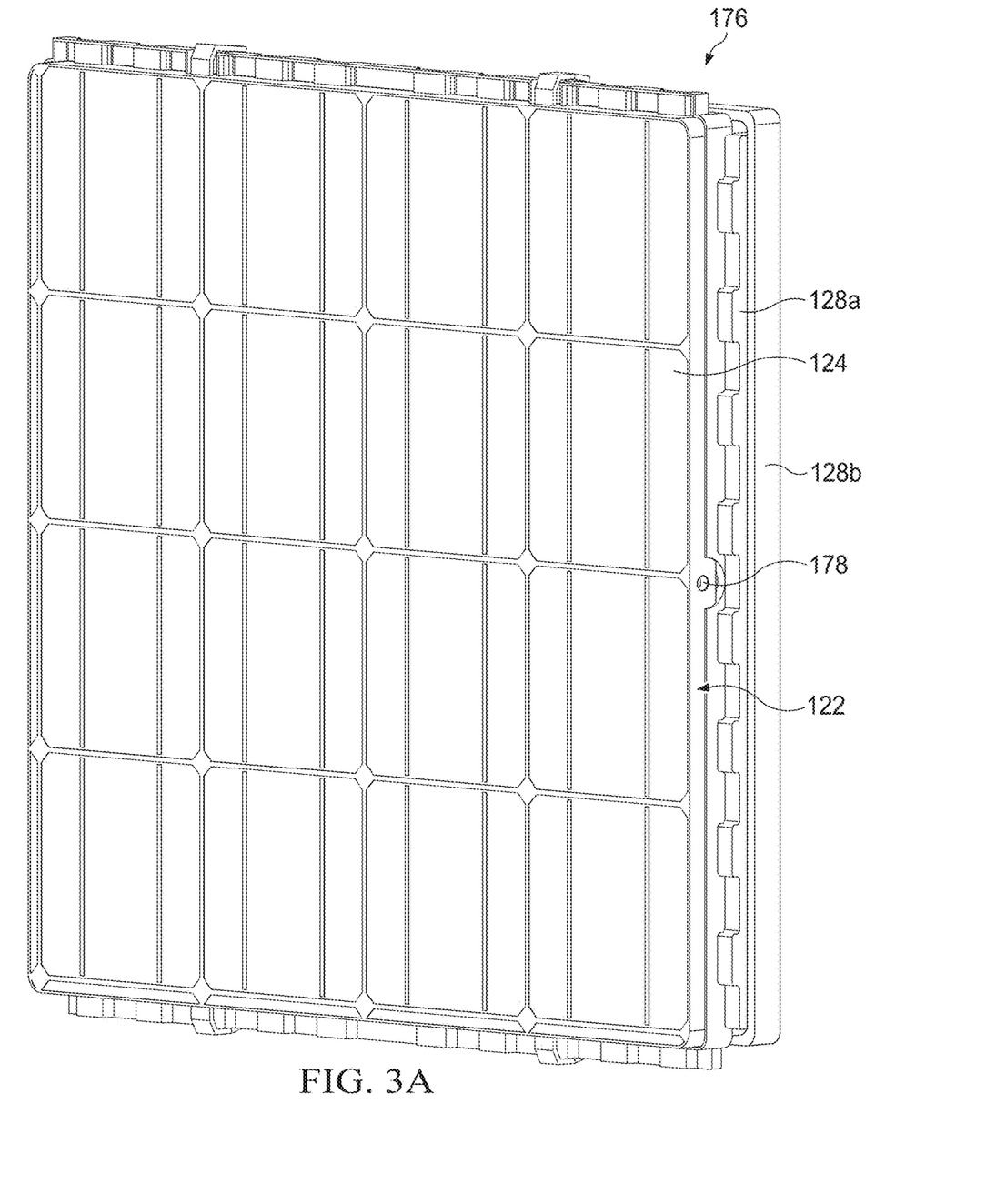
FIGS. 3A-3B are partial perspective views showing connections between a solar cell panel and a frame of an interchangeable module.
Figure 3B:
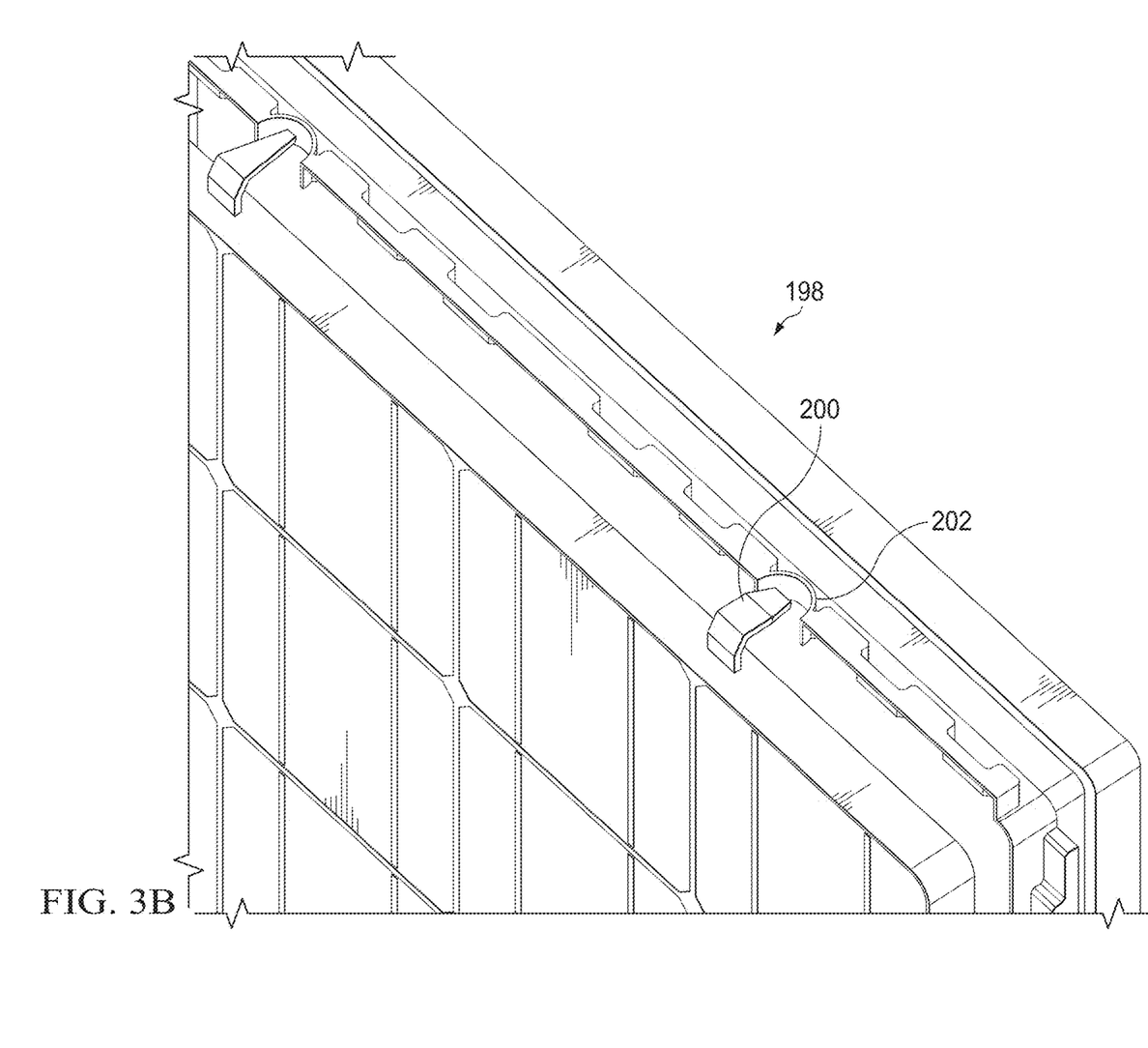

FIGS. 3A-3B are partial perspective views 176 and 198 showing connections between the solar cell panel 124 and the frame 128 of the interchangeable module 122. The solar cell panel 124 includes recesses 178 that are sized to receive one end of the ribbons 200. Frame 128 includes electrical connection points 202 and the electrically conductive ribbons 200 are disposed in the electrical connection points 202. The ribbons 200 can be glued to the frame 128 and the solar cell panel 124 is electrically insulated from the edges and at connection point 202. A ribbon from a photovoltaic panel can be glued and insulated in the same manner for the parallel and the series connection types. The ribbons 200 and the electrical connection points 202 are sealed once all parts of the frame 128 are assembled.

Figure 4A:
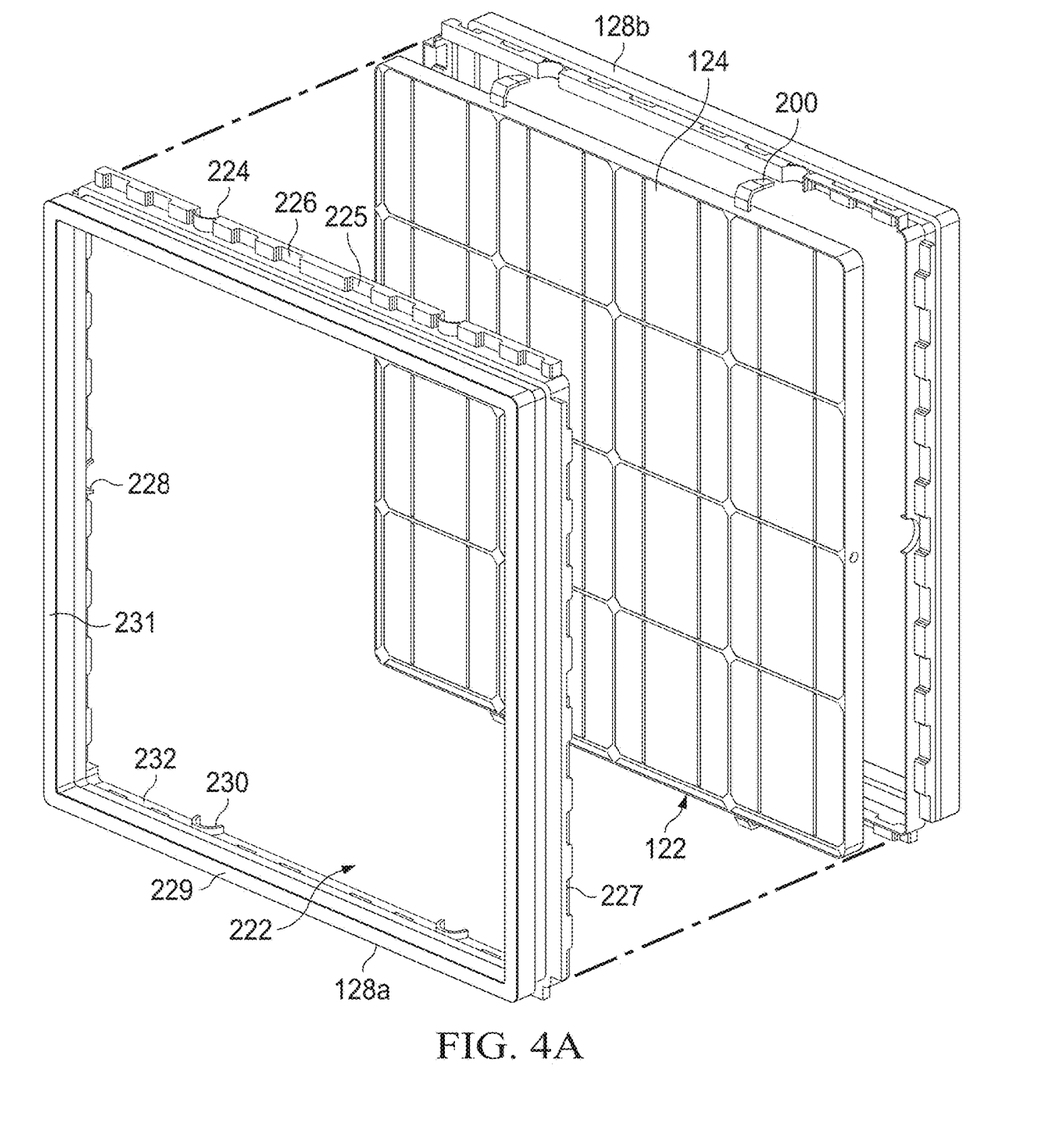
FIGS. 4A-4D are images showing a structural configuration with the parts of a frame of an interchangeable module.
Figure 4B:
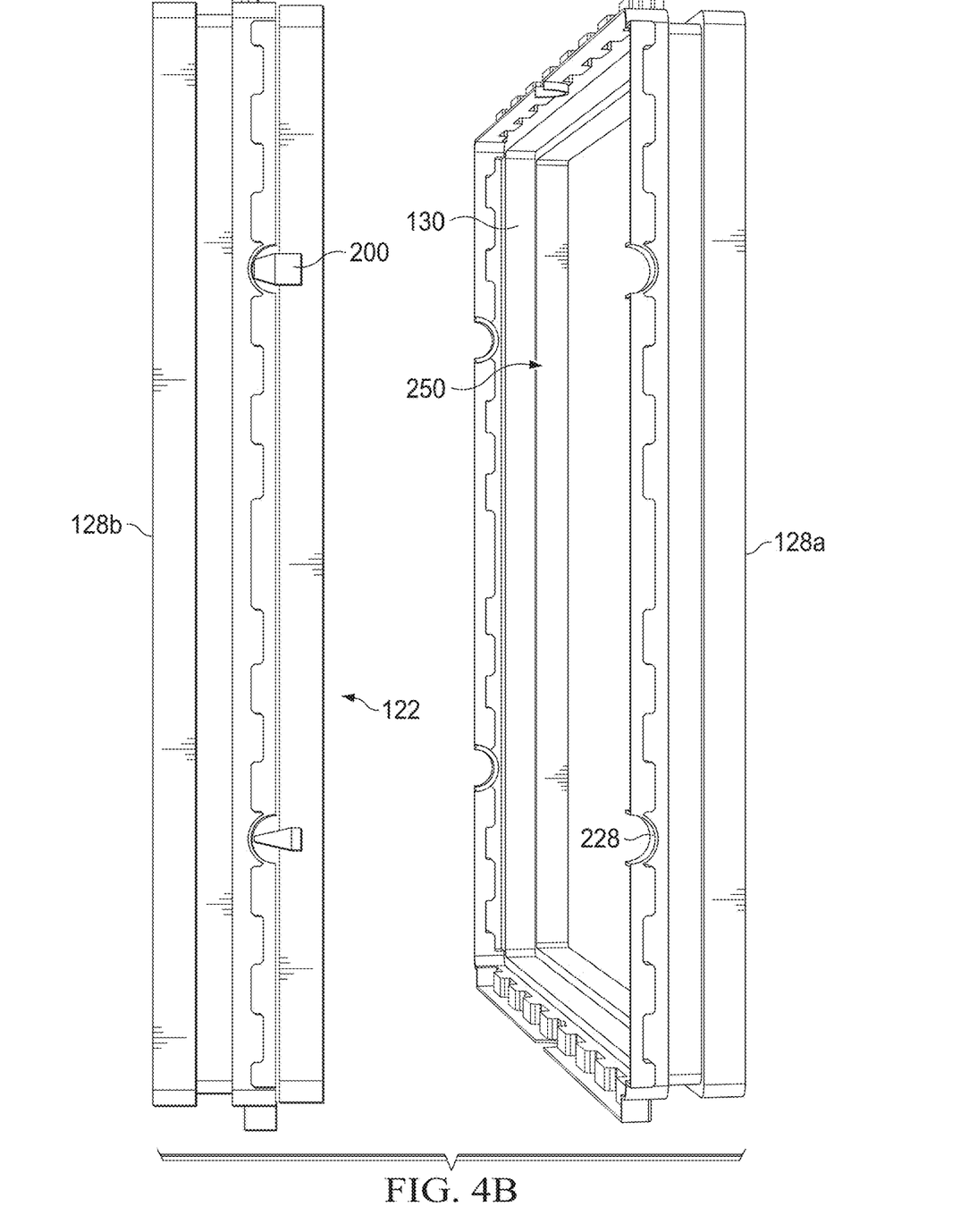
Figure 4C:
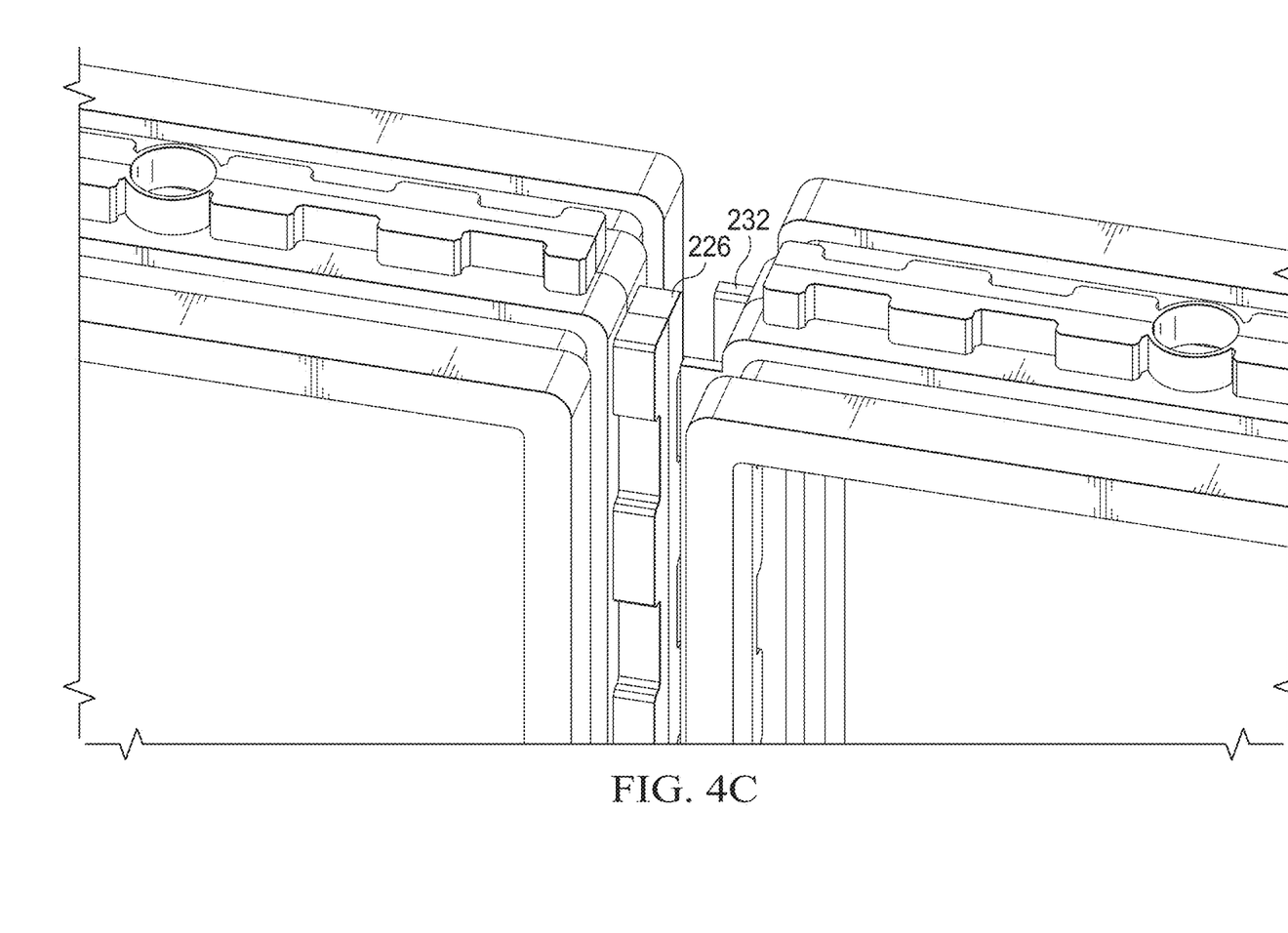
Figure 4D:
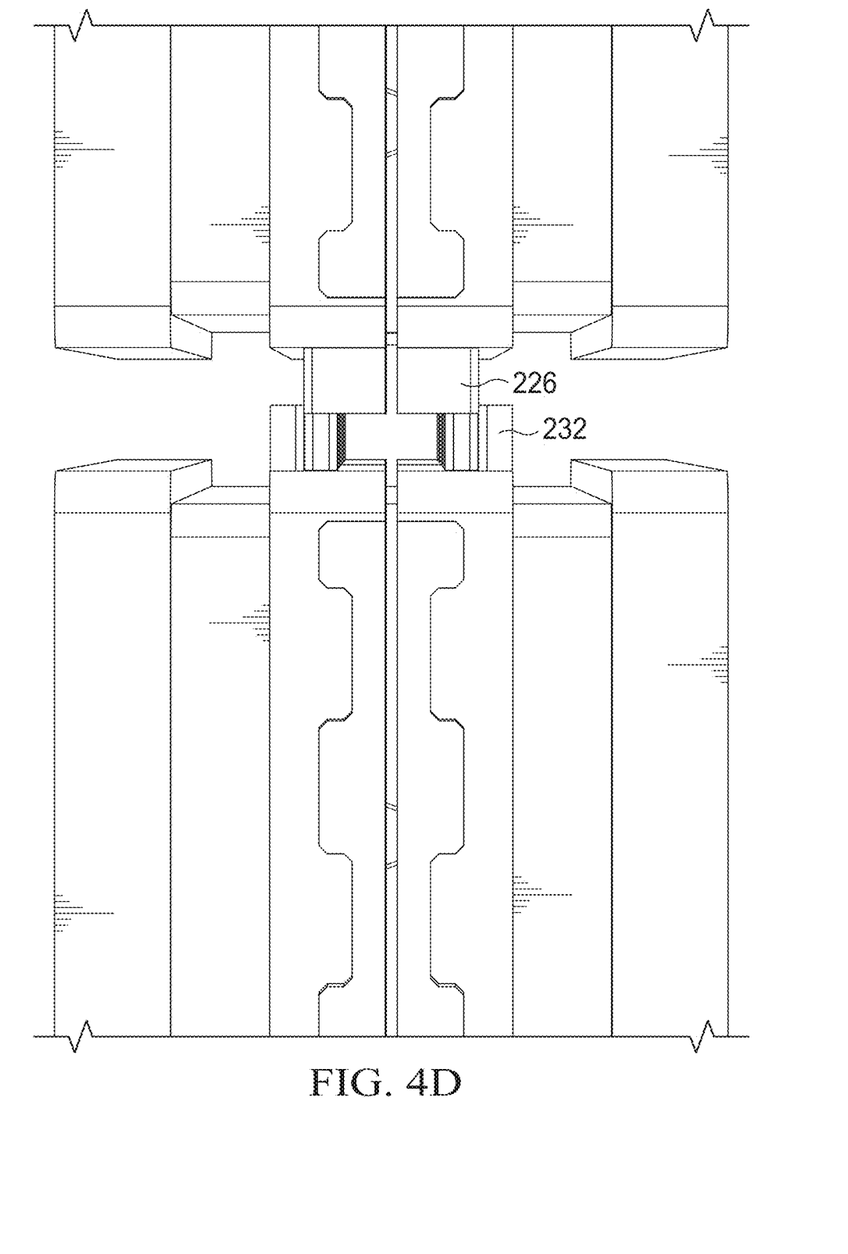

FIGS. 4A-4D are images showing a structural configuration with the parts of the frame 128 of the interchangeable module 122. Frame 128 includes a front portion 128a defining a central aperture 222 through which the face of the solar cell panel 124 is exposed and a back portion 128b is attached to the front portion 128a. The front portion 128a and the back portion 128b define a groove 130. The groove 130 extends around the central aperture 222 and opens to the central aperture 222. The groove has a length of at least 10 millimeters longer than the cell length and a groove width at least 10 millimeters longer than the cell width. The groove 130 receives the solar cell panel 124 and prevents movement of the solar cell panel 124. As described earlier in reference to FIGS. 3A-3B, the solar cell panel 124 is connected to the frame 128 through its ribbons 200 which are directly attached to electrical connection points 202. Frame 128 has two positive electrical connection points 224 and two negative electrical connection points 230. The frame 128 has male mechanical connectors 226 and female mechanical connectors 232 positioned such that the male mechanical connectors 226 on one module are engageable with the female mechanical connectors 232 of an adjacent module. The male mechanical connectors 226 of each module are positioned on a first edge 225 and a second edge 227 of the module. The female mechanical connectors 232 are positioned on a third edge 229 of the module opposite the first edge and on a fourth edge 231 of the module opposite the second edge. The structural configuration of the frame 128 has two positive electrical connection points 224 collocated with the male mechanical connectors 226 and the two negative electrical connection points 230 collocated with the female mechanical connectors 232. The electrical connections 224, 230 are weatherproof and resemble standard solar panel electrical connections. The front portion 128a and the back portion 128b of the frame 128 are mechanically attached using fasteners. The male mechanical connectors 226 are fastened at the center and the outer periphery of the connection. The teeth attachment mechanism with two male on the left and two female connections on the right is shown in FIG. 4C. FIG. 4D shows the top view of the male and female connections sealed with one another. In some implementations, the solar cell panel 124 has a thickness of between 4 and 5 mm and the frame 128 has a thickness of 40 mm or less.

The solar cell panel 124 can include fully glass material or partially glass material. In some implementations, the solar cell panel 124 includes a non-glass material with a higher thermal expansion coefficient (e.g., polymer). In a hot climate, the expansion of non-glass material can cause high strain in common designs of solar panels and can lead to cracks and degradation of the panel. For example, simulation analysis of a flat polycarbonate sheet model under loading shows high thermal expansion.

Figure 5:
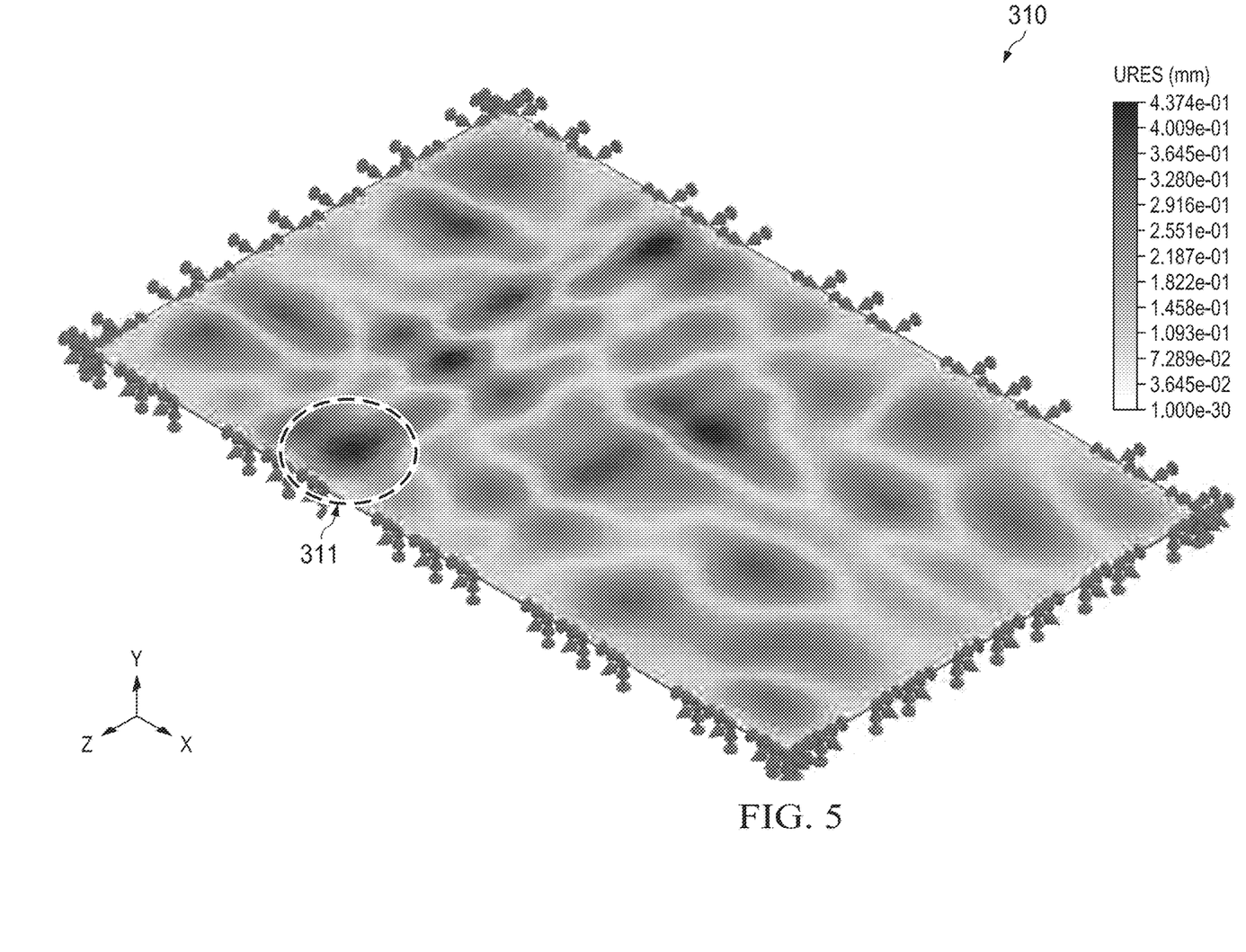
FIG. 5 is an image showing simulation results of an example polycarbonate sheet under thermal loading.

FIG. 5 is an image 310 showing simulation results of an example polycarbonate sheet under thermal loading. The model includes a flat polycarbonate sheet with 2 mm thickness and fixed at the edges as is the case in a commercial photovoltaic panel. The model sheet was assigned the width and the length of a commercial photovoltaic panel (e.g., 1×2 meters). The thermal expansion results show a maximum expansion 311 of 0.435 mm. This value can compromise the integrity of the commercial photovoltaic panels with a polymer frame because the average distance between the layers in a commercial photovoltaic panel is 0.4 mm. The described design allows the front polymer sheet to expand within the frame. This reduces the total tension of the solar panel and prevents damage. In event of thermal expansion of the front polymer sheet, the current design allows each module to be individually replaced without replacing the entire panel.

Figure 6A:
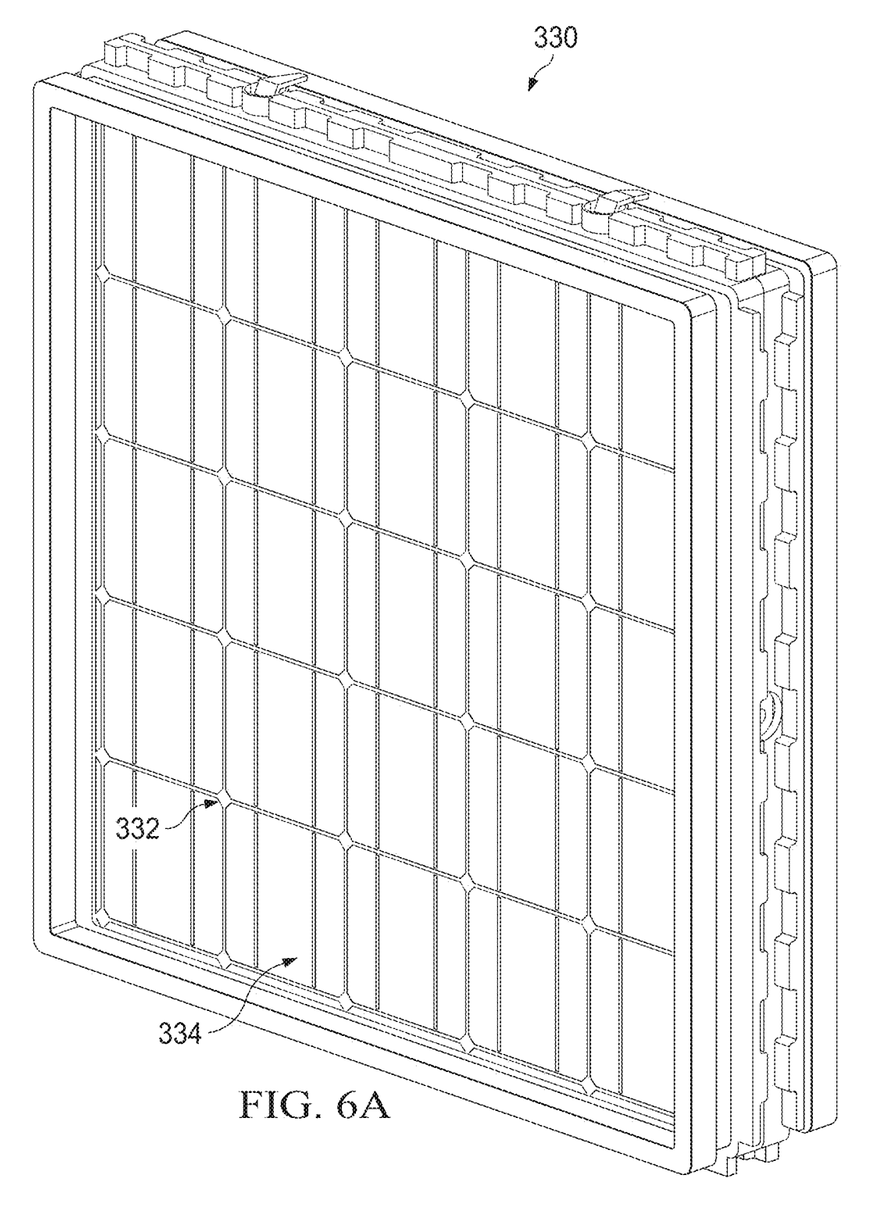
FIGS. 6A-6C are perspective views of interchangeable modules with different frame sizes.
Figure 6B:
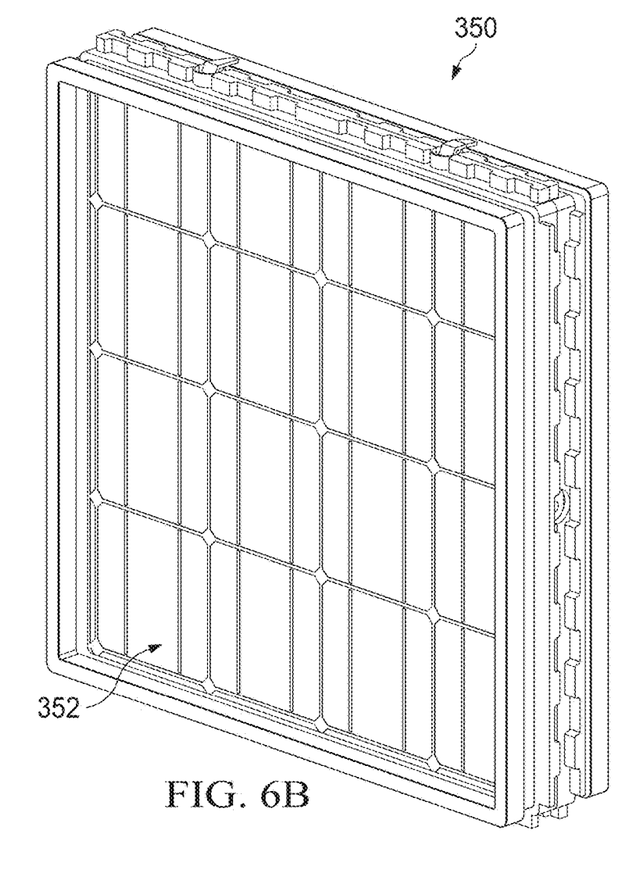
Figure 6C:
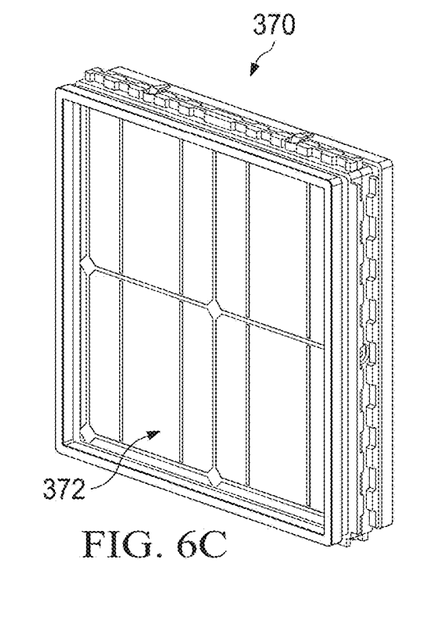

FIGS. 6A-6C are perspective views of interchangeable modules with different frame sizes 330, 350, and 370. The interchangeable modules can be designed with frames of different sizes and solar cell panels with various numbers of solar cells. The frame size and the number of solar cells in the solar cell panels depend on the application where the module is used. In some implementations, the frames are standardized industrial frame size and accommodate a full module with 60 to 72 solar cells and can connect to other modules. In some implementations, the frames are custom design and are used for smaller more flexible operations where a full module has between 4 and 36 solar cells. As illustrated, a frame 330 for the described design has a solar cell panel 332 with 30 solar cells, a frame 350 is smaller in size than frame 330 and has a solar cell panel 352 with 16 solar cells, and a frame 370 is drastically smaller in size than frame 330 and has a solar cell panel 372 with 4 solar cells.

While this specification contains many specific implementation details, these should not be construed as limitations on the scope of what may be claimed, but rather as descriptions of features that may be specific to particular implementations. Features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

What is claimed is:

1. A photovoltaic panel comprising:
   a plurality of interchangeable modules that are mechanically and electrically interconnected;
   wherein each module comprises:
      electrically conductive ribbons having a first end and a second end;
      a solar cell panel with recesses that each receive the first end of one of the electrically conductive ribbons, the solar cell panel having a face extending between peripheral edges, a cell length, and a cell width;
      a frame receiving the solar cell panel, the frame comprising:

a front portion defining a central aperture through which the face of the solar cell panel is exposed;

a back portion attached to the front portion;

a groove defined in the front portion and back portion, the groove extending into the front portion and the back portion from the central aperture and open to the central aperture, the groove having a groove length at least 10 millimeters longer than the cell length and a groove width at least 10 millimeters longer than the cell width, the solar cell panel received in the groove, the groove sized to accommodate thermal expansion of the solar cell panel within the frame;

wherein the front portion and the back portion of the frame together define electrical connection points, each electrical connection point having a void receiving the second end of one of the electrically conductive ribbons of the solar cell panel which are disposed in the electrical connection points, the electrical connection points including two positive electrical connection points and two negative electrical connection points;

wherein the frame has male mechanical connectors and female mechanical connectors positioned such that the male mechanical connectors on one module are engageable with the female mechanical connectors of an adjacent module, the two positive electrical connection points collocated with the male mechanical connectors and the two negative electrical connection points collocated with the female mechanical connectors;

wherein the male mechanical connectors of each module are positioned on a first edge and a second edge of the module, and the female mechanical connectors positioned on a third edge of the module opposite the first edge and on a fourth edge of the module opposite the second edge;

wherein the male mechanical connectors extend along the entire first edge and the entire second edge of the module, and wherein the female mechanical connectors extend along the entire third edge and the entire fourth edge; and wherein the male mechanical connectors and the female mechanical connectors are arranged in a continuous square wave pattern along the respective edges of the frame.

2. The photovoltaic panel of claim 1, further comprising fasteners attaching the front portion of the frame to the back portion of the frame.

3. The photovoltaic panel of claim 1, wherein the solar cell panel of the module comprises a plurality of solar cells with anodes and cathodes.

4. The photovoltaic panel of claim 3, wherein the anodes of all of the solar cells of the module are electrically connected to an anode of the module.

5. The photovoltaic panel of claim 3, wherein an anode of the module is electrically connected to the anodes of all the solar cells in series and a cathode of the module is electrically connected to the cathodes of all the solar cells in parallel.

6. The photovoltaic panel of claim 3, wherein an anode of the module is electrically connected to the anodes of all the solar cells in series only and a cathode of the module is electrically connected to the cathodes of all the solar cells in series only.

7. The photovoltaic panel of claim 3, wherein the cathodes of all of the solar cells of the module are electrically connected to a cathode of the module.

8. The photovoltaic panel of claim 3, wherein an anode of the module is electrically connected to the anodes of all the solar cells in parallel and cathode of the module is electrically connected to the cathodes of all the solar cells in series.

9. The photovoltaic panel of claim 1, wherein the frame comprises a non-conductive material.

10. The photovoltaic panel of claim 9, wherein the non-conductive material comprises a polymer.

11. The photovoltaic panel of claim 1, wherein the electrically conductive ribbons extend from the frame to contact other electrically conductive ribbons of another interchangeable module.

12. The photovoltaic panel of claim 11, wherein the electrically conductive ribbons comprise planar mating surfaces.

13. The photovoltaic panel of claim 1, wherein the electrical connection points extend through the frame from the central aperture and are interspersed between portions of the respective male mechanical connectors and female mechanical connectors.

14. An interchangeable module comprising:

electrically conductive ribbons having a first end and a second end;

a solar cell panel with recesses that each receive the first end of one of the electrically conductive ribbons;

a frame receiving the solar cell panel, the frame comprising:

a front portion defining a central aperture through which a face of the solar cell panel is exposed;

a back portion attached to the front portion, the front portion and the back portion of the frame together define electrical connection points, each electrical connection point having a void receiving the second end of one of the electrically conductive ribbons, the electrical connection points including two positive electrical connection points and two negative electrical connection points;

a groove defined in the front portion and back portion, the groove extending into the front portion and the back portion from the central aperture and open to the central aperture, the groove having a groove length at least 10 millimeters longer than a cell length and a groove width at least 10 millimeters longer than a cell width, the solar cell panel received in the groove, the groove sized to accommodate thermal expansion of the solar cell panel within the frame;

wherein the frame defines the electrical connection points and the electrically conductive ribbons of the solar cell panel are disposed in the electrical connection points;

wherein the frame comprises male mechanical connectors and female mechanical connectors positioned such that the male mechanical connectors on one module are engageable with the female mechanical connectors of an adjacent module, the two positive electrical connection points collocated with the male mechanical connectors and the two negative electrical connection points collocated with the female mechanical connectors;

wherein the male mechanical connectors of each module are positioned on a first edge and a second edge of the module, and the female mechanical connectors positioned on a third edge of the module opposite the first edge and on a fourth edge of the module opposite the second edge;

wherein the male mechanical connectors extend along the entire first edge and the entire second edge of the module, and wherein the female mechanical connectors extend along the entire third edge and the entire fourth edge; and wherein the male mechanical connectors and the female mechanical connectors are arranged in a continuous square wave pattern along the respective edges of the frame.

15. The interchangeable module of claim 14, further comprising fasteners attaching the front portion of the frame to the back portion of the frame.

16. The interchangeable module of claim 14, wherein the solar cell panel of the module comprises a plurality of solar cells with anodes and cathodes.

17. The interchangeable module of claim 16, wherein the anodes of all of the solar cells of the module are electrically connected to an anode of the module.

18. The interchangeable module of claim 16, wherein an anode of the module is electrically connected to the anodes of all the solar cells in series and a cathode of the module is electrically connected to the cathodes of all the solar cells in parallel.

19. The interchangeable module of claim 16, wherein an anode of the module is electrically connected to the anodes of all the solar cells in series only and a cathode of the module is electrically connected to the cathodes of all the solar cells in series only.

20. The interchangeable module of claim 16, wherein the cathodes of all of the solar cells of the module are electrically connected to a cathode of the module.

21. The interchangeable module of claim 16, wherein an anode of the module is electrically connected to the anodes of all the solar cells in parallel and a cathode of the module is electrically connected to the cathodes of all the solar cells in series.

* * * * *